United States Patent [19]

Matsuoka et al.

[11] Patent Number: 5,705,548
[45] Date of Patent: Jan. 6, 1998

[54] POLYESTER POWDER COATING COMPOSITION

[75] Inventors: Yoshiki Matsuoka; Toshiaki Hayashi, both of Tsukuba; Hiroshi Nakamura, Tsuchiura, all of Japan

[73] Assignee: Sumitomo Chemical Company, Limited, Osaka, Japan

[21] Appl. No.: 771,934

[22] Filed: Dec. 23, 1996

[30] Foreign Application Priority Data

Dec. 25, 1995 [JP] Japan ................................ 7-336893
Apr. 25, 1996 [JP] Japan ................................ 8-105650

[51] Int. Cl.$^6$ .................................................. C08K 5/16
[52] U.S. Cl. ............................................................ 524/209
[58] Field of Search ............................................... 524/209

[56] References Cited

U.S. PATENT DOCUMENTS 5,062,284  11/1991  Kubo et al. ................................ 72/46

FOREIGN PATENT DOCUMENTS 55-030750B  8/1980  Japan .
57-037177B  8/1982  Japan .

OTHER PUBLICATIONS

G.C. Fischer et al "New Epoxy Resin for Ultra–Smooth Hybrid Powder Coatings" J. Coating Technology 60, 44 (1988).

Powder Coating 20, 35–46 (1994) (Partial English language translation is attached).

*Primary Examiner*—Edward J. Cain
*Attorney, Agent, or Firm*—Birch, Stewart, Kolasch & Birch, LLP

[57] ABSTRACT

A powder coating composition comprising as essential components: (A) polyester resin having at least two hydroxyl groups in a molecule, and (B) polyvalent organic cyanate having at least two cyanate groups in a molecule of the following formula and/or its prepolymer;

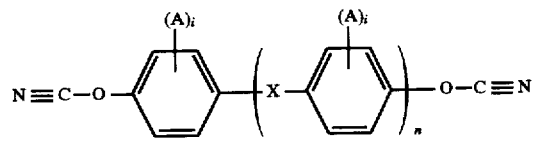

wherein

A is C1–C6 hydrocarbon group, and A may be different from each other;

X is a single bond, C1–C20 hydrocarbon group, carbonyl group, sulfone group, divalent sulfur atom or oxygen atom;

i is an integer of 0 to 3, which may be different from each other; and n is 0 or 1.

The powder coating compound gives improved environmental sanitation in curing and high surface smoothness and high corrosion resistance of the coated product.

7 Claims, No Drawings

POLYESTER POWDER COATING COMPOSITION

BACKGROUND OF THE INVENTION

1. Field of the Invention

The present invention relates to a polyester powder coating composition which gives improved environmental sanitation in curing and gives a coated product whose surface is highly smooth and highly resistant to corrosion.

2. Description of the Related Art

Heretofore, the polyester powder coating, in comparison with the solvent type coating, has a significant problem of causing orange peel on the surface. In Coating Technology 60 (762), 39 (1988), there is disclosed a technique wherein a modified bisphenol A epoxy resin of low melt viscosity is added to a polyester powder coating composition for improving the surface smoothness of the coated product.

The polyester powder coating has a problem in that it is inferior in corrosion resistance to the epoxy powder coating. In general, for improving corrosion resistance of the polyester powder coating, addition of several percent of bisphenol A type epoxy resin has been attempted. However, according to said method, owing to the low weather resistance of the epoxy resin, the weather resistance characteristic of the polyester powder coating is lowered.

Further, as a curing agent for the polyester powder coating, there has been used blocked IPDI (blocked isopholone diisocyanate). However, when such curing agent is used, ε-caprolactam, which is a blocking agent, is volatilized in baking to cause contamination of the baking oven, and lactam odor is generated to cause problems to the working environment. In an attempt to solve these problems, the use of a tetramethoxymethyl glycoluril curing agent is attempted, for example, in "Powder Coating" 20 (3), 35 (1994). However, the coating composition using the above curing agent shows defects such as low flowability in curing, popping generation, and inferiority in the secondary adhesion property after boiling water test or salt spray test.

It is known that polyvalent organic cyanate reacts with hydroxyl group containing resin to give a cured product. For example, in Japanese Patent Publication No. 55-30750 there is disclosed a composition comprising a polyvalent organic cyanate and an acrylic copolymer having hydroxyl and/or epoxy group for coating composition. In said literature, there is a description about the improvement of environmental sanitation and surface property (popping) by decreasing volatile components, but no reference is made to the surface smoothness and high corrosion resistance.

SUMMARY OF THE INVENTION

The object of the present invention is to provide a polyester powder coating composition which gives markedly improved environmental sanitation in curing, and high surface smoothness and high corrosion resistance of the coated product, in comparison with the conventional polyester powder coating composition.

As a result of intensive study, the present inventors have found that the above problems could be solved by using a specific polyvalent organic cyanate as a curing agent for the hydroxyl group-containing polyester resin.

That is to say, the present invention relates to a powder coating composition comprising as essential components: (A) polyester resin having at least two hydroxyl groups in a molecule, and (B) polyvalent organic cyanate having at least two cyanate groups in a molecule of the following formula and/or its prepolymer;

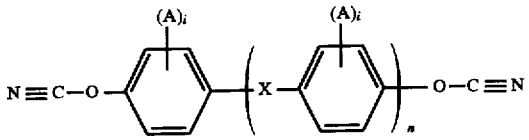

wherein

A is C1–C6 hydrocarbon group, and A may be different from each other;

X is a single bond, C1–C20 hydrocarbon group, carbonyl group, sulfone group, divalent sulfur atom or oxygen atom;

i is an integer of 0 to 3, which may be different from each other; and n is 0 or 1.

DETAILED DESCRIPTION OF THE INVENTION

The present invention is described in detail below.

Concrete examples of the polyvalent organic cyanate to be used in the present invention are 4,4'-dicyanate diphenyl, 3,3',5,5'-tetramethyl-4,4'-dicyanate diphenyl, bis(cyanate phenyl)methane, bis(4-cyanate-3,5-dimethylphenyl) methane, bis(2-cyanate-3-t-butyl-5-methylphenyl)methane, bis(4-cyanate phenyl)ethane, 2,2-bis(4-cyanate phenyl) propane, 2,2-bis(3,5-dimethyl-4-cyanate phenyl)propane, 2,2-bis(3-methyl-4-cyanate phenyl)propane, 2,2-bis-(4-cyanate-3-t-butyl phenyl)propane, 2,2-bis-(4-cyanate-3-t-butyl-6-methyl phenyl)propane, 2,2-bis(3-allyl-4-cyanate phenyl)propane, 1,1-bis(3-t-butyl-4-cyanate-6-methylphenyl)butane, 1,1-bis(4-cyanate phenyl) cyclohexane, 1,1-bis(4-cyanate-3-methyl phenyl) cyclohexane, 1,1-bis(4-cyanate-3-cyclohexyl-6-methyl) butane, bis(4-cyanate phenyl)menthane, bis(4-cyanate- 3,5-dimethyl)menthane, bis(4-cyanate-3-t-butyl-6-methyl phenyl)menthane, bis(4-cyanate phenyl)tricyclo[5,2,1,0$^{2,6}$] decane, bis(4-cyanate-3,5-dimethyl phenyl)tricyclo[5,2,1, 0$^{2,6}$]decane, bis(4-cyanate-3-t-butyl-6-methyl phenyl) tricyclo[5,2,1,0$^{2,6}$]decane, bis(4-cyanate phenyl)sulfide, bis (4-cyanate-3,5-dimethyl phenyl)sulfide, bis(3-t-butyl-4-cyanate-6-methyl phenyl)sulfide, bis(4-cyanate phenyl) sulfone, bis(4-cyanate phenyl)carbonyl, bis(4-cyanate phenyl)ether, and the like.

Above all, it is preferable to use 2,2-bis(4-cyanate phenyl) propane, 1,1-bis(3-t-butyl-4-cyanate-6-methyl phenyl) butane. In the case of giving an anti-blocking property, preservation stability such as preservation life to the coating composition, or to give an anti-yellowing property to the coating film, 1,1-bis(3-t-butyl-4-cyanate-6-methyl phenyl) butane is particularly preferable.

Further, a prepolymer, the molecular weight being from 400 to 6,000, having a triazine ring formed by trimerizing the cyanate group of the cyanic acid ester, is also usable as a curing agent of the present invention. In making a prepolymer, the cyanate monomer may be used either alone or in combination. In making a prepolymer, the above cyanate monomer can be polymerized by using a catalyst for example a protonic acid such as hydrochloric acid, or phosphoric acid; a Lewis acid such as aluminum chloride, boron trifluoride complex, or zinc chloride; an aromatic hydroxyl compound represented by phenol pyrocathecol, or dihydroxynaphthalene; an organic metal salt such as zinc naphthate, or cobalt naphthate, tin octalate, cobalt octylate;

an organic metal complex such as zinc acetyl acetonate, copper acetyl acetonate, or aluminum acetyl acetonate; a tertiary amine such as triethylamine, tributylamine, quinoline, or isoquinoline; a quaternary ammonium salt such as tetramethyl ammonium chloride, a tetrabutyl ammonium bromide; imidazoles; sodium hydroxide, sodium alkoxide, diazabicyclo[2,2,2]octane, or triphenyl phosphine; a salt such as sodium carbonate, lithium chloride, or a mixture of them.

These organic cyanates and prepolymers can be used either alone or in combination.

The amount of the organic cyanate and/or its prepolymer to be used in the polyester powder coating composition of the present invention is determined by the gel fraction in the curing product. The gel fraction is measured by the following method.

A polyester resin mixed with the predetermined amount of polyvalent organic cyanate and/or its prepolymer is cured under various conditions. The cured product is immersed in N,N-dimethylacetamide at 25° C. for 24 hours to swell. Thereafter, the swollen gel is immersed in water at 25° C. for 24 hours to shrink, and further crushed to remove the solvent and dried in a heating vacuum oven. The ratio (Wc/Wo) is defined as the gel fraction, wherein Wc is the weight of the cured product after drying and Wo is the weight of the cured product before immersing in N,N-dimethylacetamide. However, in the pigment added system, Wo and Wc are calculated based on the binder components only, excluding the pigment weight.

In the powder coating composition of the present invention, polyvalent organic cyanate and/or its prepolymer is added so as to make the gel fraction preferably in the range of 0.20 to 1.00, more preferably of 0.40 to 1.00. When the gel fraction is less than 0.20, the curing is insufficient, and a coating film having the desired performance may be unobtainable. Further, as the gel fraction is variable depending on the conditions such as the kind and the amount of the polyester resin and polyvalent organic cyanate used, and further the curing conditions, careful selection of the conditions is necessary to meet the required performance.

The hydroxyl group containing polyester resin used in the present invention is a polymer in which the main chain is formed by an ester bond with a hydroxyl group in the terminal and/or side chain. The polyester is not specifically limited insofar as usable for general powder coating composition. Further, the polyester resin to be used in the present invention can be obtained by a conventional method, such as for example, a method of reacting a polyvalent alcohol component with an excess amount of the polyvalent acid component, or, depolymerizing a highly polymerized polyester to adjust the molecular weight and to form branches by using a polyvalent alcohol such as trimethylol propane, pentaerythritol, and the like. Considering that the composition of the present invention is a powder coating composition, it is desirable to use the polyester having a hydroxyl value of 20 to 60 mgKOH/g, a number average molecular weight of 2,000–50,000, and a glass transition temperature of 40°–100° C. When the hydroxyl value is less than 20 mgKOH/g, curing of the coating film is insufficient, and when it is higher than 60 mgKOH/g, the soil-proof property of the cured coating film is lowered. When the number average molecular weight is lower than 2,000, the resin per se may become caramel-like at room temperature and show inferior anti-blocking property (powder particles stick together to form a big block), which is undesirable for the powder coating use. When the number average molecular weight is higher than 50,000, the melt viscosity in curing is high, and orange peel is apt to occur on the surface of the coated product. Further, When the glass transition temperature is lower than 40° C., the anti-blocking property of the composition is unsatisfactory, and when the temperature is higher than 100° C., the workability is lowered in preparing the composition.

The components constituting the polyester resin in the present invention basically comprise a polyvalent alcohol and a polyvalent carboxylic acid, and depending on the case, a modifying agent such as an oil (fatty acid) is added. Examples of the polyvalent alcohol are divalent alcohols such as ethylene glycol, propylene glycol, 1,3-butylene glycol, 1,6-hexane diol, diethylene glycol, dipropylene glycol, neopentyl glycol, and triethylene glycol; trivalent alcohols such as glycerine, trimethylol ethane, trimethylol propane, and trishydroxymethyl aminomethane; pentaerythritol, dipentaerythritol, and the like. Examples of the polyvalent carboxylic acid are divalent carboxylic acids such as phthalic anhydride, isophthalic acid, terephthalic acid, or their lower alkyl esters, tetrahydrophthalic anhydride, hexahydrophthalic anhydride, tetrabromophthalic anhydride, tetrachlorophthalic anhydride, 1,4,5,6,7,7-hexachloro-5-norbornene-2,3-dicarboxylic anhydride, 3,6-endomethylene-$\Delta'$-tetrahydrophthalic anhydride, maleic anhydride, fumaric acid, itaconic acid, succinic acid, succinic anhydride, adipic acid, and azelaic acid, sebacic acid; trivalent carboxylic acids such as trimellitic anhydride, trimellitic acid, and methyl cyclohexane tricarboxylic acid; and pyromellitic anhydride. As examples of an oil (fatty acid), there are oils such as linseed oil, tung oil, dehydrated castor oil, soybean oil, safflower oil, coconut oil, and castor oil; and fatty acids such as linseed oil fatty acid, soybean oil fatty acid, and tall oil fatty acid.

Additionally, rosin, phenols, epoxy compounds, vinyl compounds, and the like may be added, and further modified resin may be used.

As a catalyst for the curing reaction, the catalyst used for prepolymerizing the cyanate monomer can be used as such. Additionally, there may be used alkali metal hydroxide or alkaline earth metal hydroxide, alkali metal carbonate, alkaline earth metal carbonate, alkali metal alcoholate organo-metal compounds such as stannous octcate, di-n-butyltin diacetate, di-n-butyltin laurate, di-n-butyltin mercaptide, di-n-butyltin thiocarboxylate, di-n-butyltin maleate, dioctyltin captide, dioctyltin thiocarboxylate, dioctyltin maleate, acryloxytri-n-butyltin, acryloxytriphenyltin, allyltri-n-butyltin, allyltrimethyltin, allyltriphenyltin, bis(2-ethylhexanoate)tin, bis(neodecanoate)tin, bis(tri-n-butylstannyltin)acetylene, bis(tri-n-butyltin)acetylene dicarboxylate, bis(triphenyltin)oxide, n-butyltin hydroxide oxide, n-butyltris(2-ethylhexanoate)tin, cyclopentadienyltri-n-butyltin, 1,3-diacetoxy-1,1,3,3-tetrabutyltin oxide, diallyl-di-n-butyltin, di-n-butylbis(2-ethylhexanoate)tin, di-n-butylbis(2-ethylhexylmaleate)tin, di-n-butylbis(methylmaleate)tin, di-n-butylbis(2,4-pentanedionate)tin, di-n-butyldiacetoxytin, di-t-butyldiacrylate tin, di-n-butyl-n-butoxytin, di-n-butyldimethacrylate tin, di-n-butyldimethoxytin, di-n-butyldiacrylate tin, di-n-butyl-S,S'-bis(isooctylmercaptoacetate)tin, di-n-butyltin oxide, di-n-butyltin sulfide, diethyltin oxide, dimethylaminotri-n-butyltin, dimethylaminotrimethyltin, dimethyl-S,S'-bis(isooctylmercaptoacetate)tin, dimethyldineodecanoate tin, dimethylhydroxy(oleate)tin, dimethyltin oxide, dioctyldilaurylate tin, dioctyldineodecanoate tin, dioctyltin oxide, divinyl di-n-butyltin, 1-ethoxyvinyl tri-n-butyltin, ethynyltri-n-butyltin, methacryloxytri-n-butyltin, phenylethynyltri-n-butyltin, phenyltri-n-butyltin, tetraacetoxytin, tetraallyltin, tetra-t-butoxytin, tetra-n-butyltin, tetraethyltin, tetraisopropoxytin-isopropanol adduct, tetraisopropyltin, tetrakis (diethylamino)tin, tetrakis (dimethylamino)tin, tetramethyltin, tetra-n-octyltin, tetra-n-pentyltin, tetraphenyltin, tetravinyltin, tri-n-butylbenzoyloxytin, tri-n-butylethoxytin, tri-n-butylmethoxytin, tri-n-butyltin, vinyltri-n-butyltin, phenylmercurypropionate, and lead octate; monoamines such as triethylamine, and N,N-dimethylcyclohexylamine; diamines such as 1,4-diazabicyclo-2,2,2-octane, N,N,N',N'-tetramethylethylenediamine, N,N,N',N'-tetramethyl propane 1,3-diamine, and N,N,N',N'-tetramethylhexane 1,6-diamine; triamines such as N,N,N',N'',N''-pentadimethyl diethylene triamine, N,N,N',N'',N''-pentamethyl dipropylene triamine, tetramethyl guanidine; cyclic amines such as triethylene diamine, N,N'-dimethyl piperazine, N-methyl,N'-(2-dimethylamino)ethylpiperazine, N-methylmorphorine, N,(N',N'-diethylaminoethyl)-morphorine, and 1,2-dimethylimidazole; alcohol amines such as dimethylaminoethanol, dimethylaminoethoxyethanol, N,N,N'-trimethylaminoethanolamine, N-methyl-N'-(2-hydroxyethyl)-piperazine, and N-(2-hydroxyethyl) morphorine; etheramines such as bis(2-dimethylaminoethyl) ether ethylene glycol bis(3-dimethyl)-aminopropyl ether; and further salts such as calcium chloride, lithium chloride, lithium bromide, and potassium iodide. It is preferable to use the tin-based organometal complex and organometal salt as a catalyst. These catalysts may be used either alone or in combination. Further, as the kind and amount of the catalyst to be used are variable depending on the kind and amount of the resin and polyvalent organic cyanate, and further the curing conditions, careful selection is necessary to meet the required performance. By using these catalysts, the curing can be advantageously completed in the desired baking time.

Various additives can be added to the composition of the present invention, such as pigment, flame retardant, or leveling agent. Examples of the pigment are coloring pigments such as titanium dioxide, red iron oxide, yellow iron oxide, carbon black, phthalocyanine blue, phthalocyanine green, quinaclidon red pigment and isoindolinone type yellow pigment; extender pigments such as talc, silica, calcium carbonate and barium sulfate; and metal powder such as aluminum powder, stainless steel powder and mica powder.

As the flame retardant, there may be exemplified antimon trioxide, red phosphorus type flame retardant, bromine-containing flame retardant, etc. Further, for improving the corrosion resistance, epoxy resin can be added.

The powder coating composition of the present invention can be prepared by mixing and kneading the components by a conventional process and finely grinding. For example, the components are mixed with a Henschel mixer, melt-kneaded with an extruder, and then finely pulverized with a pin mill to produce a powder coating composition. In applying to the substrate such as a steel plate, the composition can be coated by a known powder coating method.

EXAMPLES

The present invention will be concretely illustrated with reference to the examples. It is to be noted, however, that the present invention is not limited to them. Values evaluated in the examples and comparative examples are obtained in the following manner.

Gel fraction:

The coating film cured under the respective conditions, having the initial weight of Wo, was immersed in N,N-dimethylacetamide at 25° C. for 24 hours to swell. Then, the swollen coating film was immersed in water at 25° C. for 24 hours to shrink, which was further crushed by pressing to remove the solvent, dried, the dry weight (Wc) of the shrunk coating film was measured.

The gel fraction value (Wc/Wo) is determined by dividing the dry weight (Wc) by the initial weight (Wo). In the pigment added system, Wo and Wc are calculated based on the binder components only, excluding the pigment weight.

Coating film performance:
1. Surface property: ○; good smoothness ×; bad smoothness
2. Specular gloss: Measured according to JIS K5400 7.6 (60° mirror face reflectivity)
3. Cross-cut test: Measured according to JIS K5400 8.5.1. and represented by the remaining rate of cross-cut sections (remaining number/100).
4. Pencil hardness: Measured according to JIS K5400 8.4.2.
5. Erichsen test: Measured according to JIS K5400 8.2.2.
6. Boiling test: The coated plate was immersed in boiling water for 1 hour, and the surface condition was observed.
7. Moisture resistance test: According to JIS K5400 9.2.2., the test was carried out for 300 hours.
8. Acid resistance test: Executed by immersing in 5% aqueous sulfuric acid solution at 25° C. for 240 hours.
9. Alkali resistance test: Executed by immersing in 5% aqueous sodium hydroxide solution at 25° C. for 240 hours.
10. Salt spray test: According to JIS K5400 9.1, the test was carried out for 500 hours.
11. Determination of volatile component in curing: Using a thermal analysis system SSC5200 made by Seiko Denshi Kogyo K.K., thermal weight analysis was conducted on the respective coating composition. Weight decrease rate after allowing to stand at 180° C. for 30 minutes (temperature raising rate: 50° C./min.) was measured.
12. Impact resistance: Measured according to JIS K5400 8.3.2.

Evaluation on powder coating composition:
1. Anti-blocking test: Observed the condition of the powder coating composition contained in a vinyl bag, after allowing to stand in an oven at 40° C. for 1 month.
   ○: Powder coating composition keeps fluidity;
   Δ: Block of the powder coating composition can be crushed by hand;
   ×: Fused.
2. Preservation life test: The powder coating composition contained in a vinyl bag was allowed to stand in an oven at 40° C. for 1 month. The binder component was extracted with N,N-dimethylformamide (DMF), and the pigment was separated off by centrifugation. The molecular weight (Mw) increasing rate of the extracted binder component was evaluated by using GPC (HLC8020, made by TOSOH).
3. Anti-yellowing test: Using a coating composition with no additives, an over-baking test was made at 200° C. for 1 hour and at 220° C. for 1 hour. The color difference (ΔE) was determined based on the respective sample cured under the standard conditions of 180° C., 30 minutes.

Preparation Example 1

Into a reactor equipped with a thermometer, a stirrer, a dripping funnel and a refluxing cooler, under nitrogen atmosphere, 114.2 g (0.5 mol) of 2,2-bis(4-hydroxyphenyl)propane (made by Mitsui Toatsu Kagaku Kogyo K.K.) and 685 g of methyl isobutyl ketone were charged, which were dissolved at room temperature, and the solution was cooled to 0° C. Next, 67.7 g (1.1 mol) of cyanogen chloride was added dropwise in 2 hours. Five minutes after the start of dropping cyanogen chloride, 111.2 g (1.1 mol) of triethylamine was added dropwise at 0° to 6° C. in 2 hours and 30 minutes, and the product was further kept at the same temperature for 30 minutes. After washing with 300 g of 3% aqueous hydrochloric acid, the product was washed with 300 g of water twice. From the content of dicyanate in the resulting organic layer, the reaction rate was found to be 99%. Next, the organic layer was subjected to reduced pressure and concentrated to 178 g, to which 228 g of isopropyl alcohol was added dropwise, and the mixture was cooled to 5° C. and stirred for 3 hours. The resulting slurry was filtered and washed with 114 g of isopropyl alcohol, and the resultant was dried in air to give 121.1 g of white crystal having a melting point of 80° C. (yield, 87%). By liquid chromatography analysis, starting materials of bisphenol and monocyanate were not detected. The resulting white crystal was analyzed by gas chromatography, and diethyl cyanamide was not detected. Further, a chlorine ion analysis was attempted by potential difference titration using silver nitrate, and the chlorine ion was found to be no more than 10 ppm. Hereinafter, the resulting crystal is described as BPAC by abbreviation.

Example 1

To 866 g of ER6610 (trade mark, made by Nippon Ester K.K., polyester resin having terminal hydroxyl groups, hydroxyl value of 31 mgKOH/g) which was preliminarily pulverized with a pin mill (made by Alpine), 134 g of BPAC [2,2-bis-(4-cyanatophenyl)propane] prepared in Preparation Example 1 was added, and the mixture was pre-mixed with a SUPERMIXER-Y-5 (made by K.K. KAWATA). Next, using LABO-PLAST-MILL 30C150 (made by TOYO SEIKI K.K.), the composition was melt-kneaded at 100° C., then it was finely pulverized with a pin mill (made by Alpine) to make a powder coating composition.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes.

The coating film showed favorable coating film performance as shown in Table 2. It had particularly excellent surface properties in comparison with the conventional IPDI product.

Also, the maximum value of the rust width on one side of the cross-cut part after the salt spray test was 2 mm, but the related part was only one spot. Other cut parts showed good corrosion resistance at about 1 mm.

Further, in order to check the amount of the volatile substance from the coating composition in curing, the same composition was analyzed in the same temperature elevating profile as the curing by TGA (thermal weight analyzer). As a result, the weight decrease in 30 minutes after start of the measurement was 0.2%.

Comparative Example 1

To 828 g of ER6610 (trade mark, made by Nippon Ester K.K., polyester resin having terminal hydroxyl groups, hydroxyl value of 31 mgKOH/g) which was preliminarily pulverized with a pin mill (made by Alpine), 169 g of Crelan UI (blocked isophorone diisocyanate made by Sumitomo-Bayer urethane K.K.), prepared in Preparation Example 1, 3 g of di-n-butyltin dilaurate (made by Tokyo Kasei K.K.), 4.64 g of SEIKUOL Z (trade mark, benzoin made by Seikosha K.K.), and 4.64 g of KESI50W-P67 (trade mark, acryl polymer made by Estron Chemical Co.) were added, and the mixture was pre-mixed with a SUPERMIXER-Y-5 (made by K.K. KAWATA). Next, using LABO-PLAST-MILL 30C150 (made by TOYO SEIKI K.K.), the composition was melt-kneaded at 100° C., after which it was finely pulverized with a pin mill (made by Alpine) to make a powder coating composition.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes. The coating film performance is shown in Table 2.

Orange peel was observed to remain on the surface. The rust width on one side of the cross-cut part after the salt spray test was 3 mm over almost the whole surface.

Further, the decrease in weight resulting from the loss of the volatile substance in curing was 2.7%.

TABLE 1

|  | Example 1 | Comparative Example 1 |
|---|---|---|
| ER6610 | 866 | 828 |
| Crelan UI | — | 169 |
| BPAC | 134 | — |
| Di-n-butyltin dilaurate | — | 3 |
| SEIKUOL Z | — | 4.64 |
| RESIFLOW-P67 | — | 4.64 |

TABLE 2

|  | Example 1 | Comparative Example 1 |
|---|---|---|
| Baking conditions | 180° C., 30 min. | 180° C., 30 min. |
| Gel fraction | 0.77 | 0.80 |
| Surface quality | o | x |
| Specular gloss (%) | 103 | 98 |
| Cross-cut test | 100/100 | 100/100 |
| Pencil hardness | F | F |
| Ericksen | 8 mm passed | 8 mm passed |
| Boiling water resistance test | Normal | Normal |
| Moisture resistance test | Normal | Normal |
| Acid resistance test | Normal | Normal |
| Alkali resistance test | Normal | Normal |
| Salt spray test | One side: 2 mm | One side: 3 mm |
| Volatile amount (%) | 0.2 | 2.7 |

Preparation Example 2

Into a reactor equipped with a thermometer, a stirrer, a dripping funnel and a refluxing cooler, under nitrogen atmosphere, 200 g (0.5228 mol) 1,1-bis(4-hydroxy-3-t-butyl- 6-methylphenyl)butane (trade mark SUMIRISER-BBM-S made by Sumitomo Chemical Co., Ltd.) and 800 g methyl isobutyl ketone were charged, which were dissolved at room temperature, after which 148.1 g (1.464 mol) triethylamine was added thereto. After cooling the solution to 0° C., 89.99 g (1.464 mol) cyanogen chloride was added dropwise at 0° to 6° C. in 2 hours, and the mixture was kept at the same temperature for 1 hour. After washing with 300 g of water three times, the solvent was concentrated to 650 g by concentration under reduced pressure, to which 400 g of methanol was added dropwise. The mixture was cooled to 5° C. and stirred for 3 hours. The resulting slurry was filtered and washed with 200 g of methanol, and then dried under reduced pressure to give 208 g of white crystal having a melting point at 123° C. (yield, 92%). The purity of dicyanate by liquid chromatography (LC) was 98.0%. The diethyl cyanamide content in the methyl isobutyl ketone solution after washing in water was 1.90%. Hereinafter, the resulting substance is described as BBMC in abbreviation.

Example 2

To 559 g of ER6610 (trade mark, made by Nippon Ester K.K., polyester resin having terminal hydroxyl groups) which was preliminarily pulverized with a pin mill (made by Alpine), 333 g of TIPURE-R902 (trade mark, made by DuPont Japan K.K., titanium oxide), 108 g of BPAC [2,2-bis-(4-cyanatophenyl)propane] prepared in Preparation Example 1, and 0.07 g of di-n-butyltin dilaurate (made by Tokyo Kasei K.K.) were added, and the mixture was pre-mixed with a SUPERMIXER-Y-5 (made by K.K. KAWATA). Next, using double roll LABORATORY MIL (made by Kansai Roll), the mixture was kneaded under the conditions of the front roll at 20 rpm, 80° C., and the back roll 24 rpm, 110° C. Thereafter, the mixture was finely pulverized with a pin mill (made by Alpine), and filtrated with a 140 mesh screen to give a powder coating composition.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes. Without showing popping on the coating surface, favorable coating film performance was obtained as shown in Table 4.

Example 3

Based on the mixing recipe of Table 3, to 565 g of ER6610 (trade mark, made by Nippon Ester K.K., polyester resin having terminal hydroxyl groups) which was preliminarily pulverized with a pin mill (made by Alpine), 333 g of TIPURE-R902 (trade mark, made by DuPont Japan K.K., titanium oxide), 102 g of BBMC [1,1-bis-(3-t-butyl-4-cyanate-6-methylphenyl)butane] prepared in Preparation Example 2, and 0.334 g of di-n-butyltin dilaurate (made by Tokyo Kasei K.K.) were added, and the mixture was pre-mixed with a SUPERMIXER-Y-5 (made by K.K. KAWATA). Next, using double roll LABORATORY MIL (made by Kansai Roll), the mixture was kneaded under the conditions of the front roll at 20 rpm, 80° C., and the back roll 24 rpm, 110° C. Thereafter, the mixture was finely pulverized with a pin mill (made by Alpine), and filtrated with a 140 mesh screen to give a powder coating composition.

The resulting coating composition was applied to a zinc phosphate treated plate JIS G3141 (SPCC-SD)PB137T made by Nippon Test Panel Kogyo K.K. by electrostatic coating, and cured is a hot air oven at 180° C. for 30 minutes. No generation of popping was observed on the cured coating surface. The coating composition and coating film performances were favorable, as shown in Table 4. Especially, in the evaluation of the preservation life, the elevation rate of molecular weight (Mw) was only 0.6%, and the product of this example was known to have markedly long preservation life in comparison with Comparative Example 2 in which the blocked IPDI was used as a curing agent.

Example 4

The coating composition prepared in Example 3 was electrostatically coated on a zinc phosphate treated plate JIS G3141 (SPCC-SD)PB137T made by Nippon Test Panel Kogyo K.K. After coating, the plate was baked in a hot air oven at 200° C. and 220° C. for 60 minutes, respectively. Color differences (ΔE value) of these coated plates, were evaluated on the basis of the coated plate which was cured at 180° C. for 30 minutes (ref. Table 5). In this test, the ΔE values were 0.73 at 200° C. and 2.9 at 220° C., showing outstandingly high anti-yellowing properties in comparison with the ΔE value in Comparative Example 3.

Comparative Example 2

To 548 g of ER6610 (trade mark, made by Nippon Ester K.K., polyester resin having terminal hydroxyl groups) which was preliminarily pulverized with a pin mill (made by Alpine), 331 g of TIPURE-R902 (trade mark, made by DuPont Japan K.K., titanium oxide), 112 g of crelan UI (trade mark, made by Sumitomo-Bayer Urethane K.K., blocked isophorone diisocyanate), 1.98 g of di-n-butyltin dilaurate (made by Tokyo Kasei K.K.), 3.31 g of SEIKUOL Z (trade mark, made by Seikosha, benzoin), and 3.31 g of RECIFLO-P67 (trade mark, made by Estron Chemical Co., acryl polymer) were added, and the mixture was pre-mixed with a SUPERMIXER-Y-5 (made by K.K. KAWATA). Next, using double roll LABORATORY MIL (made by Kansai Roll), the mixed composition was kneaded under the conditions of the front roll at 20 rpm, 80° C., and the back roll 24 rpm, 110° C. Thereafter, the mixture was finely pulverized with a pin mill (made by Alpine), and filtrated with a 140 mesh screen to give a powder coating composition.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes. The coating film performance is shown in Table 4. Its coating performance was excellent, but the elevation rate of the molecular weight (Mw) after 1 month was 2.1%, showing that the reaction progressed markedly in preserving in comparison with the value of 0.6% of Example 4.

Comparative Example 3

The coating composition prepared in Example 4 was electrostatically coated on a zinc phosphate treated plate JIS G3141 (SPCC-SD)PB137T made by Nippon Test Panel Kogyo K.K. After the coating, the plate was baked in a hot air oven at 200° C. and 220° C. for 60 minutes, respectively. Color differences (ΔE value) of these coated plates were evaluated on the basis of the coated plate which was cured at 180° C. for 30 minutes (ref. Table 5). The ΔE values of this test were 1.7 at 200° C. and 4.1 at 220° C., indicating great discoloration at each temperature in comparison with Comparative Example 4.

TABLE 3

| | Example 2 | Example 3, 4 | Comparative example 2 | Comparative example 3 |
| --- | --- | --- | --- | --- |
| ER6610 | 559 | 565 | 548 | 553 |
| BPAC | 108 | — | — | — |
| BBMC | — | 102 | — | — |
| CRELAN UI | — | — | 112 | 113 |
| Di-n-butyltin | 0.07 | 0.334 | 1.98 | 2.00 |

TABLE 3-continued

|  | Example 2 | Example 3, 4 | Comparative example 2 | Comparative example 3 |
|---|---|---|---|---|
| dilaurylate |  |  |  |  |
| TIPURE-R902 | 333 | 333 | 331 | 333 |
| SEIKUOL Z | — | — | 3.31 | — |
| RESIFLOW-P67 | — | — | 3.31 | — |

TABLE 4

|  | Example 2 | Example 3 | Comparative example 2 | Comparative example 3 |
|---|---|---|---|---|
| Baking conditions | 180° C. 30 min. | 180° C. 30 min. | 180° C. 30 min. | 180° C. 30 min. |
| Physical properties of coating film |  |  |  |  |
| Gel fraction | 0.84 | 0.83 | 0.80 | 0.82 |
| Cross-cut test | 100/100 | 100/100 | 100/100 | 100/100 |
| Pencil hardness | H | H | H | H |
| Ericksen | 8 mm | 8 mm | 8 mm | 8 mm |
| Impact resistance | 50 cm | 50 cm | 50 cm | 50 cm |
| Volatile amount | 0.5% | 0.4% | 2.1% | 1.7% |
| Physical properties of coating composition composition |  |  |  |  |
| Anti-blocking property | — | ○ | — | ○ |
| Mw-initial value | — | 49,900 | — | 47,500 |
| Mw-one month later | — | 50,200 | — | 49,400 |
| Mw increase rate | — | 0.6% | — | 2.1% |

TABLE 5

|  | Example 4 | | Comparative example 3 | |
|---|---|---|---|---|
|  | L*/a*/b* | ΔE value | L*/a*/b* | ΔE value |
| Reference value | 91.21/−0.81/−3.32 | — | 93.82/−0.69/−2.10 | — |
| 200° C. | 91.52/−0.46/−2.71 | 0.73 | 92.32/−0.68/−3.42 | 1.7 |
| 220° C. | 91.61/−0.54/−0.49 | 2.9 | 94.05/−1.15/1.33 | 4.7 |

Example 5

Based on the mixing recipe of Table 6, to 595 g of ER6610 (trade mark, made by Nippon Ester K.K., polyester resin having terminal hydroxyl groups) which was preliminarily pulverized with a pin mill (made by Alpine), 333 g of TIPURE-R700 (trade mark, made by DuPont Japan K.K., titanium oxide), 72 g of BBMC [1,1-bis-(3-t-butyl-4-cyanate-6-methylphenyl)butane] prepared in Preparation Example 2, and 0.4 g of di-n-butyltin oxide (made by Tokyo Kasei K.K.) were added, and the mixture was pre-mixed with a SUPERMIXER-Y-5 (made by K.K. KAWATA). Next, using double roll LABORATORY MIL (made by Kansai Roll), the mixture was kneaded under the conditions of the front roll at 20 rpm, 80° C., and the back roll 24 rpm, 115° C. Thereafter, the mixture was finely pulverized with a pin mill (made by Alpine), and filtrated with a 140 mesh screen to give a powder coating composition.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes. As shown in Table 7, the surface of the cured coating film and the basic properties were good.

Comparative Example 4

Based on the mixing recipe of Table 6, to 559 g of ER6610 (trade mark, made by Nippon Ester K.K., polyester resin having terminal hydroxyl groups) which was preliminarily pulverized with a pin mill (made by Alpine), 333 g of TIPURE-R902 (trade mark, made by DuPont Japan K.K., titanium oxide), 108 g of BPAC [2,2-bis-(4-cyanate phenyl) propane] prepared in Preparation Example 1, and 1.33 g of zinc naphthate (made by Kishida Kagaku K.K.) were added, and the mixture was pre-mixed with a SUPERMIXER-Y-5 (made by K.K. KAWATA). Next, using double roll LABORATORY MIL (made by Kansai Roll), the mixture was kneaded under the conditions of the front roll at 20 rpm, 80° C., and the back roll 24 rpm, 115° C. Thereafter, the mixture was finely pulverized with a pin mill (made by Alpine), and filtrated with a 140 mesh screen to give a powder coating composition. The gel time of this powder coating composition was adjusted to the order of 3 minutes, in the same manner as in the case of using di-n-butyltin dilaurylate.

The resulting coating composition was applied to a zinc phosphate treated plate JIS G3141 (SPCC-SD)PB137T made by Nippon Test Panel Kogyo K.K. by electrostatic coating, and cured in a hot air oven at 180° C. for 30 minutes. As shown in Table 7, the cured coating film did not satisfy the basic physical properties.

TABLE 6

|  | Example 5 | Comparative example 4 |
|---|---|---|
| ER6610 | 595 | 559 |
| BBMC | 72 | — |
| BPAC | — | 108 |
| Di-n-butyltin oxide | 0.4 | — |
| Zinc naphthate | — | 1.33 |
| TIPURE-R700 | 333 | — |
| TIPURE-R902 | — | 333 |

TABLE 7

|  | Example 5 | Comparative example 4 |
|---|---|---|
| Baking conditions | 180° C. 30 min. | 180° C. 30 min. |
| Gel fraction | 0.8 | Measurement impossible due to paste-like coating |
| Cross-cut test | 100/100 | 57/100 |
| Pencil hardness | H | 4B |
| Ericksen | 8 mm | 8 mm |
| Impact resistance | 50 cm | 10 cm |
| Volatile amount | 0.3% | — |

The powder coating composition of the present invention gives good environment sanitation in cured state, and gives a coating film whose surface is highly smooth and highly corrosion resistant.

What is claimed is:

1. A powder coating composition comprising as essential components: (A) polyester resin having at least two hydroxyl groups in a molecule, and (B) polyvalent organic cyanate having at least two cyanate groups in a molecule of the following formula and/or its prepolymer as essential components;

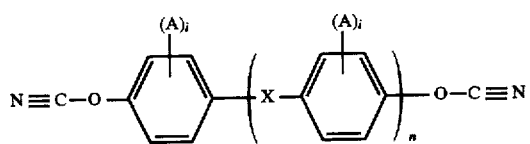

wherein

- A is C1–C6 hydrocarbon group, and A may be different from each other;
- X is a single bond, C1–C20 hydrocarbon group, carbonyl group, sulfone group, divalent sulfur atom or oxygen atom;
- i is an integer of 0 to 3, which may be different from each other; and
- n is 0 or 1.

2. The powder coating composition according to claim 1, wherein the hydrocarbon group (A) in the polyvalent organic cyanate is in an ortho position to the cyanate group.

3. The powder coating composition according to claim 1, wherein the hydroxyl value of the polyester resin is in the range of 20 mgKOH/g to 60 mgKOH/g, the number average molecular weight is in the range of 2000 to 50000, and the glass transition temperature is in the range of 40° C. to 100° C.

4. The powder coating composition according to claim 1 or 2, wherein the polyvalent organic cyanate is 1,1-bis(3-t-butyl-4-cyanate-6-methylphenyl)butane.

5. The powder coating composition according to claim 1 or 2, which further contains (C) a catalyst to accelerate the curing reaction.

6. The powder coating composition according to claim 1 or 2, further containing a catalyst (C), wherein the catalyst (C) is a tin-based organometal compound.

7. A coated product made by coating the powder coating composition of claim 1 or 2.

* * * * *